United States Patent
Della Torre et al.

(10) Patent No.: US 12,147,236 B2
(45) Date of Patent: Nov. 19, 2024

(54) METHODS AND SYSTEMS FOR PATH PLANNING IN A KNOWN ENVIRONMENT

(71) Applicant: Caja Elastic Dynamic Solutions Ltd., Tel Aviv (IL)

(72) Inventors: Reuven Della Torre, Ramat Gan (IL); Guy Glass, Binyamina (IL)

(73) Assignee: CAJA ELASTIC DYNAMIC SOLUTIONS LTD., Binyamina (IL)

( * ) Notice: Subject to any disclaimer, the term of this patent is extended or adjusted under 35 U.S.C. 154(b) by 0 days.

(21) Appl. No.: 17/618,803

(22) PCT Filed: Jun. 7, 2020

(86) PCT No.: PCT/IB2020/055345
§ 371 (c)(1),
(2) Date: Dec. 13, 2021

(87) PCT Pub. No.: WO2020/250101
PCT Pub. Date: Dec. 17, 2020

(65) Prior Publication Data
US 2022/0300002 A1    Sep. 22, 2022

Related U.S. Application Data

(60) Provisional application No. 62/860,821, filed on Jun. 13, 2019.

(51) Int. Cl.
*G05D 1/02* (2020.01)
*G01C 21/34* (2006.01)
*G05D 1/00* (2006.01)

(52) U.S. Cl.
CPC ....... *G05D 1/0217* (2013.01); *G01C 21/3492* (2013.01); *G05D 1/0088* (2013.01)

(58) Field of Classification Search
CPC ............... G05D 1/0217; G05D 1/0088; G05D 2201/0216; G05D 1/0289; G01C 21/3492;
(Continued)

(56) References Cited

U.S. PATENT DOCUMENTS 3,096,433 A * 7/1963 Daspit .................... G08G 5/025
244/175
6,085,147 A   7/2000 Myers
(Continued)

FOREIGN PATENT DOCUMENTS

WO     2019004081 A1    1/2019

OTHER PUBLICATIONS

"A new approach for determining optimal paths in a dynamic 2D environment using monotone framed-octrees", Xu, Jinhui et al. 1997 IEEE International Conference on Systems, Man, and Cybernetics. Computational Cybernetics and Simulation, 1997 (Year: 1997).*

(Continued)

*Primary Examiner* — Joan T Goodbody
*Assistant Examiner* — Godfrey Aleksander Maciorowski
(74) *Attorney, Agent, or Firm* — KENEALY VAIDYA LLP

(57) ABSTRACT

Systems and methods for path planning by creating a three dimensional weighted graph representing a physical area wherein the third dimension comprise planes, wherein each plane represents a time unit, further wherein nodes can be connected only between different planes.

12 Claims, 3 Drawing Sheets

(58) Field of Classification Search
CPC .............. G01C 21/206; G01C 21/3453; G06Q 10/047; G06Q 50/28; G06Q 10/08; G05B 2219/40476; B25J 9/1664
See application file for complete search history.

(56) References Cited

U.S. PATENT DOCUMENTS

| | | | |
|---|---|---|---|
| 2004/0249809 | A1 | 12/2004 | Ramani et al. |
| 2005/0216181 | A1 | 9/2005 | Estkowski et al. |
| 2014/0301633 | A1 | 10/2014 | Furukawa et al. |
| 2017/0039666 | A1* | 2/2017 | Kuersten ............ G06Q 30/0251 |
| 2017/0186232 | A1 | 6/2017 | Dange |
| 2020/0160732 | A1* | 5/2020 | Nakadai ................. G01C 21/26 |

OTHER PUBLICATIONS

"A time expanded network based algorithm for safe and efficient distributed multi-agent coordination", Ferrati, Mirko and Pallottino, 52nd IEEE conference on Decision and Control, IEEE, 2013, pp. 2805-2810 (Year: 2013).*

"A new approach for determining optimal paths in a dynamic 2D environment using monotone framed-octrees", Xu, Jinui et al. 1997 IEEE International Conference on Systems, Man, and Cybernetics. Computation Cybernetics and Simulation, 1997 (Year: 1997).*

Ferrati, Mirko, "A time expanded network based algorithm for safe and efficient distributed multi-agent coordination" 52nd IEEE conference on Decision and Control, IEEE, 2013, pp. 2805-2810 (Year: 2013).*

Ferrati, Mirko et al: "A time expanded network based algorithm for safe and efficient distributed multi-agent coordination", 52nd IEEE Conference on Decision and Control, IEEE, Dec. 10, 2013 (Dec. 10, 2013), pp. 2805-2810.

Surynek, Pavel ED—Napoli Amedeo: "Time-expanded graph-based propositional encodings for makespan-optimal solving of cooperative path finding problems", Annals of Mathematics and Artificial Intelligence, Baltzer, Basel, CH, vol. 81, No. 3, Aug. 2, 2017 (Aug. 2, 2017) , pp. 329-375.

\* cited by examiner

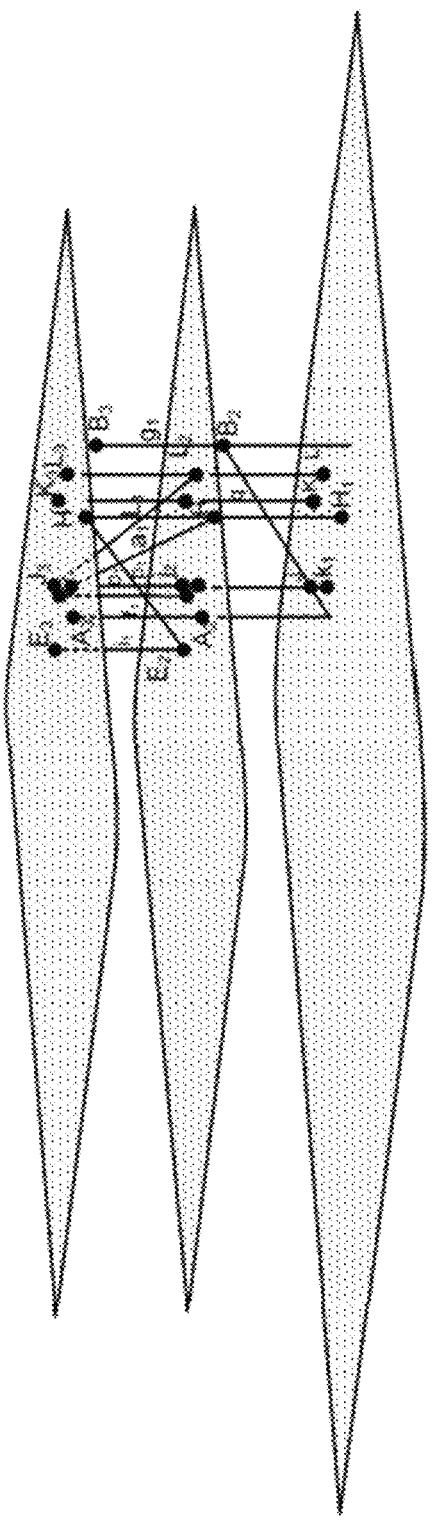

METHODS AND SYSTEMS FOR PATH PLANNING IN A KNOWN ENVIRONMENT

BACKGROUND

1. Technical Field

Embodiments of the present invention relate generally to methods and systems for path planning in a partially controlled environment.

2. Description of Related Art

Now days, path planning and movement of robots or other autonomous vehicles require complex collision preventing systems which may require sensors, requiring and consuming computing power locally in the vehicle, slowing down the movements, creating, unplanned blocks, etc. even in cases wherein the environment details were known.

Hence, an improved systems and methods as described in this application are still a long felt need.

BRIEF SUMMARY

According to an aspect of the present invention a method comprising: creating a three dimensional weighted graph representing a physical area wherein the third dimension comprise planes, wherein each plane represents a time unit, further wherein nodes can be connected only between different planes; providing or calculating initial edges information for said graph, wherein each edge represents the weight between each two nodes in said graph and further wherein said weight represent time and can be represented using said third dimension planes in said graph; providing moving objects information; receiving missions' information; calculating a route from a first mission's first location to a first mission's second location using said weighted graph and according to predefined parameters and according to said moving objects information; calculating affected nodes according to said calculated route and said moving object information; updating said graph wherein said update prevent using nodes that were allocated by said calculated route and prevent using said affected nodes; and calculating next route for next mission according to said missions' information and according to said previous changes in said graph.

It is further within provision of the invention to be wherein said updating said graph is performed by saving a graph layer that comprise only the information about blocked nodes and edges.

It is further within provision of the invention to further comprise step of removing said layer wherein said layer is outdated.

It is further within provision of the invention to further comprise steps of receiving, in real-time or near real-time, the location of a moving object; and updating said graph according to any incompliance with said planned path.

It is further within provision of the invention to further comprise step of: recalculating any affected planned route according to said update according to said incompliance.

It is further within provision of the invention to be wherein temporary blocking is represented by changing the weight of an edge in said graph to a high enough value.

It is further within provision of the invention to be wherein said updated in said graph does not contain information regarding the identity of the blocking moving object.

It is further within provision of the invention to be wherein said recalculating involve assigning a different moving object to a previously path calculated for a mission.

It is thriller within provision of the invention to be wherein part of the moving objects are actual moving objects and part of the moving objects are simulated moving objects.

Another aspect of the present invention provides a system comprising: at least two moving objects in data communication with central computing device having at least one processor; and at least one memory including computer program code configured to, with the at least one processor, cause the computing device to at least perform: maintaining a database representing a three dimensional weighted graph representing a two dimensional physical area and wherein the third dimension represents a time; receiving from a user or calculating initial edges information for said graph, wherein each edge represents the weight between each two nodes in said graph and further wherein said weight represent time and can be represented using said third dimension planes in said graph; maintaining a database of moving objects information; receiving, from a user or from an external system, missions' information; calculating a route from a first mission's first location to a first mission's second location using said weighted graph and according to predefined parameters and according to said moving objects information, calculating affected nodes according to said calculated route and said moving object information; updating said graph wherein said update prevent using nodes that were allocated by said calculated route and prevent using said affected nodes; and calculating next route for next mission according to said missions' information and according to said previous changes in said graph.

These, additional, and/or other aspects and/or advantages of the present invention are: set forth in the detailed description which follows, possibly inferable from the detailed description; and/or learnable by practice of the present invention.

BRIEF DESCRIPTION OF THE DRAWINGS

In order to understand the invention and to see how it may be implemented in practice, a plurality of embodiments will now be described, by way of non-limiting example only, with reference to the accompanying drawings, in which:

FIG. 3 illustrates an embodiment of the invention showing connections between each two nodes where each plane represents time unit.

DETAILED DESCRIPTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for path planning in a partially controlled environment.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder. And ultimately when the features manifest, so an entirely new feature be recalled. Reference throughout this specification to "one embodiment" or "an embodiment" means that a particular feature, structure, or characteristic described in connection with the embodiment is included in at least one embodiment of the invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of B, or C" and "A, B, and/or C" means A alone, B alone, C alone, A and B together, A and C together, B and C together, or A, B and C together.

The term 'plurality' refers hereinafter to any positive integer (e.g, 1, 5, or 10).

The invention relates to methods and systems for solving path planning issues wherein moving objects such as robots or other autonomous vehicles have to navigate to given goal coordinates ensuring that any part of the given path is free from any other moving object.

Generally speaking, the method and system may allow the calculation of a free path which moving objects may follow without the need to detect collisions and negotiate priorities in real time. In order to provide a free path (usually the shortest or fastest), the method and system may provide not only a set of nodes from the starting position (starting node) to the target position (target node) but also the absolute time in which the moving object is allowed to leave each position (node) in the path as well as which nodes and edges are affected by the moving object and hence does not allow other moving object to pass in. In such method and system, the moving objects does not require any collision related sensors.

Figure 1:
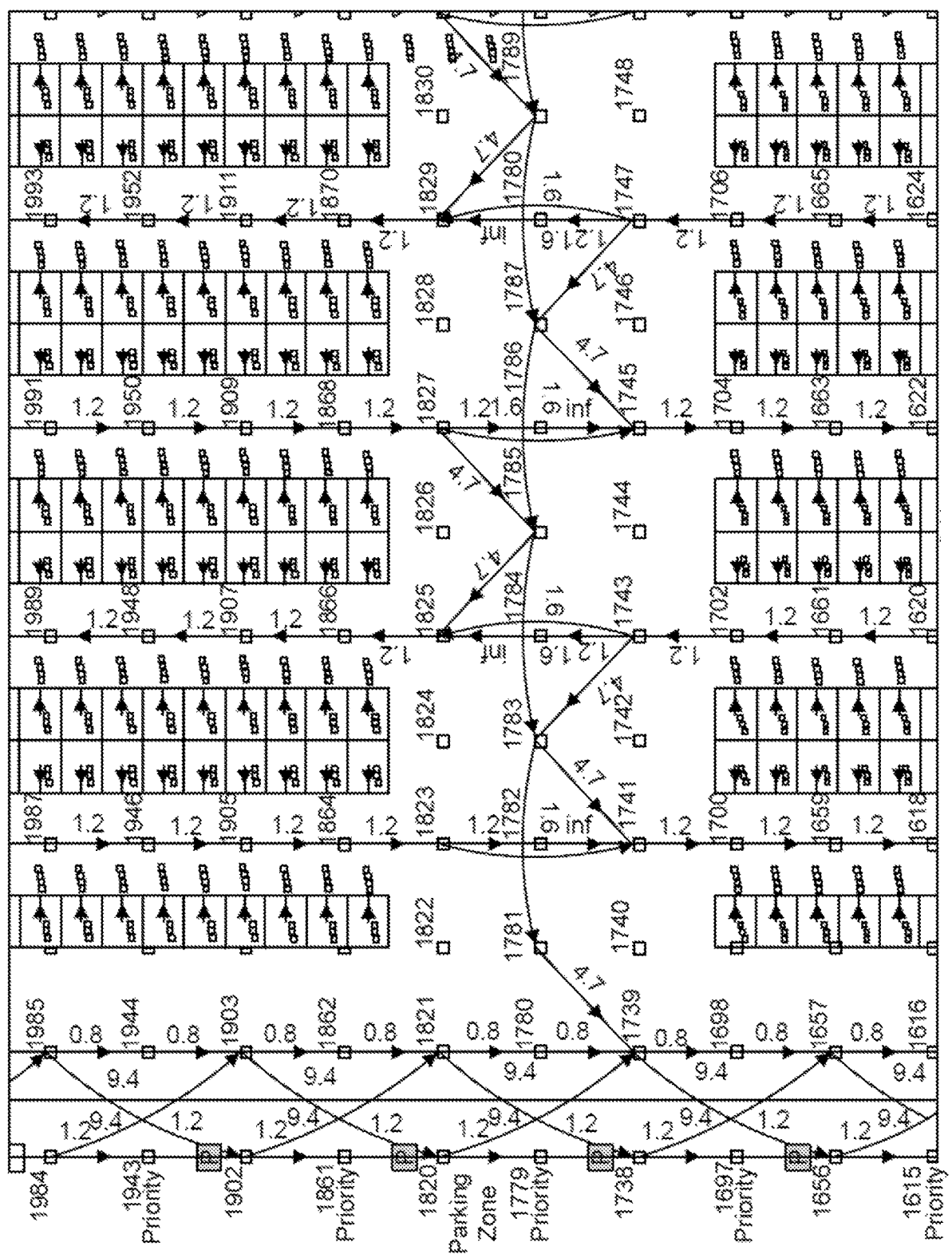
FIG. 1 illustrates an example of an industrial warehouse.

The method takes into account a known location, for example an industrial warehouse that can be represented in a two dimensional (2D) or three dimensional (3D) graph as depicted in FIG. 1. Nodes may be assigned to such 2D graph. Each node represents a location that is reachable by the moving objects and hence have at least one nearby node. The length of time required for a specific moving object to get from a node to its nearby node is referred to as the edge or the weight.

In this example, one wishes to allow hordes of different kinds of robots to performs variety of missions within the industrial warehouse. To allow such, one must use a system that plan the path according the given missions and parameters of the robots.

Once a location is provided, the method will require creating a three dimensional weighted graph representing the physical area, in this example the layout and formation of the industrial warehouse. As explained above, the 2D warehouse's layout and formation and a third dimension that represent time. The third dimension may be comprised of planes and each plane may represent a time unit (for example, one second). Since the weight, i.e. the time required for a robot to move from one node to another, cannot be zero time units the connection of nodes in the graph may only be achieved by moving in the third (time) dimension using the planes of that dimension.

In order to avoid proximal heuristic and in order to save CPU power in real time, first initial edges calculation or inputting is required for the graph. The initial graph may comprise of the nodes and each two nearby nodes will have a known weight/edge per moving object or kind of moving object. Once such is provided, an initial graph may show all the connections between each two nodes using the third dimension planes, as depicted in FIG. 3.

The system using the method may also require a database comprising all the possible moving objects' information, such may include length, width, speed when empty, speed when carrying objects, moving limitations, etc.

Once received, the system may be ready to start path calculation. For such, the system may receive a list of missions to perform. Such missions may be in the current example—retrieving an object from a certain location in the warehouse, relocating an object, etc. Each mission may include at least a starting location and ending location. In further embodiments the mission may include further steps and/or actions.

In the first path calculation for the system, a first location (starting location) and second location (ending location) are provided and route calculation may only need to take into account the user's predefined parameters and the moving object's limitations as no outside limitations are imposed on the path planning. Such user predefined parameters may be, for example, "calculate the fastest route", "calculate the shortest route" or "calculate the most energy efficient route", etc. Moving object's limitations may be, for example, width that does not allow entry to some of the locations in the warehouse, etc. hence, the system may make use of the graph's pre-prepared calculations to find the relevant path for the relevant moving object.

Figure 2:
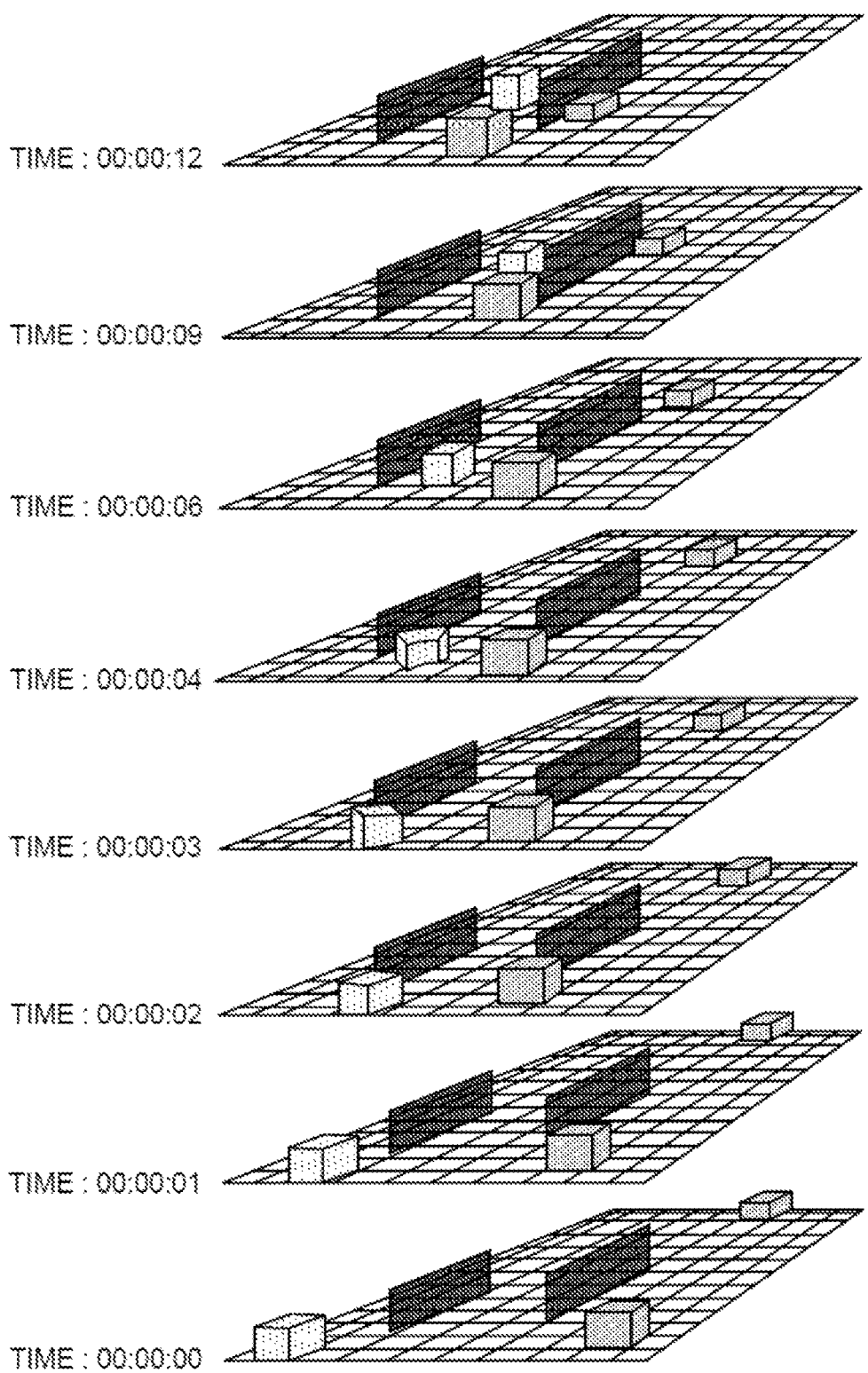
FIG. 2 illustrates map changes over time.

The system may now provide the path information to the moving object and may further calculate all the affected nodes and edges based on the path planned (see FIG. 2). As may be understood, each time a moving object is moving it may prevent other moving objects to enter the node it is leaving, the node that it moving to and the edge between them (all or some of them, depending on the distance and speed). In addition, it may, depending on the layout and formation of the physical location, to close routes even if it is not using them. In addition, the moving object may, for example, block a two-way pass due to its turning radius, etc.

In order to represent a temporary blocking as mentioned above, the weight of the edge between the two nodes may be change to infinity or any unlikely high number in the third dimension planes relevant (i.e., the amount of time it would take, for example, to make a wide radius turn). This may prevent the system from using this edge or nodes as it is inefficient or impossible. Using this method may, in some cases, create a situation in which the system cannot plan a new route due to blocking. In such case, the system may allow adding special edges, for example, an edge for "moving" from the current node to itself (i.e., wait in place). This may be used as long as it more beneficial to stay put instead of going in a different direction, for example, in case of a temporary blocking that will delay the moving object in 5 seconds but a different route will be longer in 7 seconds, it is still beneficial to stay put 1 extra second.

The calculation of the affected node and routes is time limited according to the relevant calculation and hence may require updating the graph for the relevant nods and edges in specific planes on the third dimension of the graph. In some embodiments of the invention, the changes may be saved in a manner that will save storage, retrieval speed and CPU usage, for example by only saving the actual changes as a new layer. In further embodiments, only a limited number of layers may be saved, for example by removing any layer that does not affect the graph any more (i.e., outdated).

The system may then keep calculating the next routes for next missions according to missions' information and according to the previous changes (blockings) in the graph. In that manner, the system may calculate and plan path without an external systems or limitations.

The calculated path may then be delivered to the moving object for execution.

In some embodiments of the invention, the system may require to know the location of the moving object. Such may be achieved either by sensing and/or reporting from the moving object itself or by an outside detection and reporting system.

As the method takes into account the exact time a moving object get in and get out from each node and edge, any change forced by the physical world requires attention by the system. As a moving object, in some cases, must not only get from the starting node to the target node but it has to do so in a certain time to avoid collision with other moving objects.

Changes in the physical world might occur due to objects that fail to follow their allocated route, unpredictable obstacles or other unforeseeable reasons. In all these cases, new path may be allocated to the objects to meet then missions. The system may identify which objects will be affected and calculate new routes in real time.

In some embodiments of the invention, in order to save storage, allow faster retrieval of data and reduce CPU usage the system may not save in the graph information regarding which moving object creates blocking and allow a subsystem to find who is the problematic moving object.

In several embodiments of the invention, the system may drop mission during its execution and assign it to a different moving object. Such may be decided in cases that a due to incompliance changes to graph made the use of the new assigned moving object over a predefined threshold of efficiency.

In further embodiments of the invention, the system and method may be used to simulate the movement of moving objects, for example, a simulation of adding one hundred additional robots to a current two actual robots. Such may be useful in many testing scenarios without the need to actual run the objects in the physical location. One example may be to test if a specific number of robots can co-exist in a warehouse of X square meters, etc.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims aid the equivalents thereof.

The invention claimed is:

1. A method comprising:
    creating, by a computing device having at least one processor, a three dimensional weighted graph representing a physical area wherein the third dimension comprise planes, wherein each plane represents a discrete time unit, further wherein nodes are connected between different planes, and
    the three dimensional weighted graph being maintained on a database by the computing device;
    providing by said computing device or thereby calculating initial edges information for said graph, wherein each edge represents the length of the time required for a specific moving object to move from one node of the edge to a second node in the three dimensional weighted graph;
    providing by said computing device moving objects information;
    receiving by said computing device missions' information, wherein each mission includes at least one starting node and a target node being defined the node at which a given mission is completed within an industrial warehouse;
    calculating by said computing device a route or free path including at least one allocated node from a starting node and a starting time to a target node using said weighted graph and according to the missions' information and according to said moving objects information,
    wherein calculating a route or free path comprises calculating an absolute time at which the specific moving object is allowed to leave each node;
    delivering the calculated route to the specific moving object being in data communication with the computing device for execution;
    navigating the specific moving object along the calculated route;
    calculating affected nodes by the specific moving object, which do not allow other moving object to pass in according to said calculated route and the specific moving object information,
    updating said graph by saving changes being indicative of information being indicative of blocked nodes and edges and affected nodes and by preventing using the allocated nodes and the provided or calculated edges and preventing using said affected nodes; and
    calculating a next route for a next mission according to said missions' information and according to said previous changes in said graph.

2. The method of claim 1 wherein said updating said graph is performed by saving a two-dimensional physical area of the graph that comprise only the information being indicative of the blocked nodes and edges.

3. The method of claim 2 further comprising step of removing said two-dimensional physical area wherein said two-dimensional physical area is outdated.

4. The method of claim 1 further comprising steps of:
    receiving, in real-time or near real-time, the location of a moving object; and
    updating said graph according to any incompliance with said planned path.

5. The method of claim 4 further comprising step of:
    recalculating any affected planned route according to said update according to said incompliance.

6. The method of claim 1 wherein said updated in said graph does not contain information regarding the identity of the blocking moving object.

7. The method of claim 5 wherein said recalculating involve assigning a different moving object to a previously path calculated for a mission.

8. The method of claim 1 wherein part of the moving objects are actual moving objects and part of the moving objects are simulated moving objects.

9. A system comprising:
    at least two moving objects in data communication with central computing device having at least one processor; and at least one memory including computer program code configured to, with the at least one processor, cause the computing device to at least perform:
    maintaining a database having a three dimensional weighted graph representing a two dimensional physical area of a warehouse, wherein the third dimension comprise planes, and wherein each one of said planes represents a time instance, further wherein nodes are connected between different planes;

receiving or calculating initial edges information for said three dimensional weighted graph, wherein each edge represents the length of the time required for a specific moving object of the at least two moving objects to move from one node of the edge to a second node of said edge in said three dimensional weighted graph;

maintaining a database of moving objects information;

receiving missions' information, wherein each mission includes at least one starting node and a target node at which the mission is completed within said warehouse;

calculating a route or free path including at least one allocated node from a starting node and a starting time to a target node using said weighted graph and according to the missions' information and according to said moving objects information, wherein calculating a route or free path comprises calculating an absolute time at which the specific moving object is allowed to leave each node;

delivering the calculated route to said specific moving object for execution;

navigating the specific moving object along the calculated route;

calculating affected nodes by the specific moving object, which do not allow other moving object to pass in according to said calculated route and the specific moving object information;

updating said graph by saving changes being indicative of information being indicative of blocked nodes and edges and affected nodes and by preventing using the allocated nodes and the provided or calculated edges and preventing using said affected nodes; and calculating a next route for a next mission according to said missions' information and according to said previous changes in said graph.

10. The system of claim 9 wherein part of the moving objects are actual moving objects and part of the moving objects are simulated moving objects.

11. The system of claim 9 wherein said at least two moving objects comprise robots of different types.

12. The system of claim 9 further comprising a database comprising at least one of the three dimensional weighted graph or moving objects information.

* * * * *